United States Patent Office 3,145,213
Patented Aug. 18, 1964

3,145,213
SACCHARIN DERIVATIVES AND THEIR
PRODUCTION
Angelo John Speziale, Creve Coeur, and Gino J. Marco, Webster Groves, Mo., assignors to Monsanto Company, a corporation of Delaware
No Drawing. Filed Oct. 12, 1961, Ser. No. 144,563
5 Claims. (Cl. 260—301)

This invention relates to new and useful derivatives of saccharin and to methods of making same.

The new derivatives of saccharin can be represented by the formula

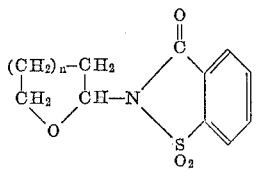

wherein $n$ is a whole number from 1 to 2. These novel derivatives of saccharin can be prepared by reacting saccharin with 2,3-dihydrofuran or 2,3-dihydropyran in the presence of an acid catalyst. While a wide range of reaction temperatures can be used provided the system is fluid (i.e. temperatures above the freezing point of the system up to and including the boiling point of the system) it is preferred to employ a reaction temperature in the range of from about 30° C. to about 125° C. Where and when desired an inert organic solvent can be used, e.g. benzene, toluene, xylene, acetone, dioxane, dimethylformamide, etc.

As illustrative of the preparation of the compounds of this invention is the following:

Example I

To a suitable reaction vessel equipped with a thermometer, agitator and reflux condenser is charged 18.3 parts by weight (substantially 0.1 mol) of saccharin, 17.0 parts by weight (substantially 0.1 mol) of 2,3-dihydropyran, and approximately 45 parts by weight of benzene. While agitating and at room temperature there is added approximately 0.16 part by weight of hydrogen chloride in approximately 0.71 part by weight of diethyl ether. The mixture is then refluxed for 17 hours, cooled to room temperature, neutralized with solid sodium carbonate, and the neutralized mass is then filtered. The filter cake is washed with water and then dried. There is obtained 22.4 parts by weight of N-(2-tetrahydropyranyl) o-benzoic sulfimide

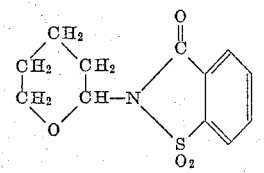

a white crystalline solid melting at 137.0–138.5° C.

Example II

Employing the procedure of Example I but replacing 2,3-dihydropyran with an equimolecular amount of 2,3-dihydrofuran there is obtained N-(2-tetrahydrofuranyl) o-benzoicsulfimide

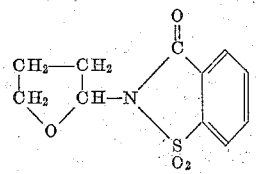

Other acid catalysts than hydrogen chloride which are operable include the strong mineral acids such as hydrogen bromide, sulfuric acid, and the like, and the aromatic sulfonic acids such as benzene sulfonic acid, p-toluene sulfonic acid, and the like. Any catalytic amount of the acid catalyst can be used but in general from 0.01 to 2 percent by weight based on the 2,3-dihydropyran or 2,3-dihydrofuran charged will be employed in preparing the saccharin derivatives of this invention.

The new compounds are valuable fungicides against soil-borne pathogens. Activity was demonstrated by pipetting a 5 ml. aliquot of a 1% solution of the test material into a Mason jar containing one pound of infected soil. This amounts to 100 p.p.m. of the test material. The jar was sealed and the contents thoroughly mixed by vigorous shaking. The treated soil was incubated at room temperature and 24 hours later transferred to 4 inch clay pots. Five seeds of each of four crop plants, beans, cotton, cucumber and peas, were sown in each pot. The seeded pots were then incubated at 70° F. and at high humidity (98% R.H.) to insure activity of the "damping-off" organisms in the soil. Twenty-four hours later, the pots were removed to a greenhouse where disease assessments were made 10–14 days later. The percent emergence and disease incidence was recorded. The measure of effectiveness was the number of healthy plants emerging out of 20. Ten or less healthy plants are observed with an untreated control and therefore a test material giving a sum of 11 or less is regarded as inactive whereas more than 17 is rated excellent, 15–17 promising and 12–14 fair. The figures in the table below are averages of two replications.

| Test material: | Healthy plants out of 20 |
|---|---|
| N-(2-tetrahydropyranyl) o-benzoicsulfimide | 16 |
| Untreated control | 2 |

Although the novel fungicidal agents of this invention are useful per se in controlling a wide variety of fungal organisms, it is preferable that they be supplied to the organisms or to the environment of the organisms in a dispersed form in a suitable extending agent.

In the instant specification and appended claims it is to be understood that the term "dispersed" is used in its widest possible sense. When it is said that the fungicidal agents of this invention are dispersed, it means that the particles of the fungicidal agents of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the fungicidal agents of this invention in a carrier such as dichloro-difluoromethane and like fluorochloroalkanes which boil below room temperature at atmospheric pressure.

In the instant specification and appended claims it is to be understood that the expression "extending agent" includes any and all of those substances in which the fungicidal agents of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the fungicidal agents of this invention employed in combatting or controlling fungal organisms can vary considerably provided the required dosage (i.e., toxic or lethal amount) thereof is supplied to the organisms or to the environment of the organisms. When the extending agent is a liquid or mixture of liquids (e.g. as in solutions, suspensions, emulsions, or aerosols) the concentration of the fungicidal agent employed to supply the desired dosage generally will be in the range of 0.001 to 50 percent by weight. When the extending agent is a semi-solid or solid, the concentration of the fungicidal agent employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared fungicidal spray or particulate solid. In such a concentrate composition, the fungicidal agent generally will be present in a concentration of 5 to 95 percent by weight, the residue being any one or more of the well-known fungicidal adjuvants, such as the various surface active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the fungicidal agents of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., at atmospheric pressure and having a flash point above about 80° F., particularly kerosene), mineral oils having an unsulfonatable residue above about 80 percent and preferably above about 90 percent. In those instances wherein there may be concern about the phytoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the fungicidal agents of this invention are to be supplied to the fungal organisms or to the environment of the organisms as aerosols, it is convenient to dissolve them in a suitable solvent and disperse the resulting solution in dichlorodifluoromethane or like chlorofluoroalkane which boils below room temperature at atmospheric pressure.

The fungicidal agents of this invention are preferably supplied to the fungal organisms or to the environment of the organisms in the form of emulsions or suspensions. Emulsions or suspensions are prepared by dispersing one or more fungicidal agents of this invention either per se or in the form of an organic solution thereof in water with the aid of a water-soluble surfactant. The term "surfactant" as employed here and in the appended claims is used as in Volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the fungicidal agents of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary-active substances which may be anion-active (or anionic), cation active (or cationic), or non-ionizing (or non-ionic) which are described in detail in Volume I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion active, cation-active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued August 5, 1958). In general it is preferred that a mixture of water-soluble anionic and water-soluble non-ionic surfactants be employed.

The fungicidal agents of this invention can be dispersed by suitable methods (e.g., tumbling or grinding in solid extending agents either of organic or inorganic nature and supplied to the fungal organism's environment in particulate form. Such solid materials include for example, tricalcium phosphate, calcium carbonate, kaolin, bole, kieselguhr, talc, bentonite, fuller's earth, pyrophillite diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g. bentonite. These mixtures can be used for fungicidal purposes in the dry form, or, by addition of water-soluble surfactants or wetting agents the dry particulate solids can be rendered wettable by water so as to obtain stable aqueous dispersions or suspensions suitable for use as sprays.

For special purposes the fungicidal agents of this invention can be dispersed in a semi-solid extending agent such as petrolatum or soap (e.g., sodium stearate or oleate or palmitate or mixtures thereof) with or without the aid of solubility promoters and/or surfactants or dispersing agents.

In all of the forms described above the dispersions can be provided ready for use in combating fungal organisms or they can be provided in a concentrated form suitable for mixing with or dispersing in other extending agents. As illustrative of a particularly useful concentrate is an intimate mixture of one or more fungicidal agents of this invention with a water-soluble surfactant which lowers the surface tension of water in the weight proportions of 0.1 to 15 parts of surfactant with sufficient of the fungicidal agent of this invention to make 100 parts by weight. Such a concentrate is particularly adapted to be made into a spray for combatting various forms of fungal organisms by the addition of water thereto. As illustrative of such a concentrate is an intimate mixture of 95 parts by weight of N-(2-tetrahydropyranyl) o-benzoicsulfimide and 5 parts by weight of a water-soluble non-ionic surfactant such as the polyoxyethylene derivative of sorbitan monolaurate.

Another useful concentrate adapted to be made into a spray for combatting fungal organisms is a solution (preferably as concentrated as possible) of one or more fungicidal agents of this invention in an organic solvent therefor. The said liquid concentrate preferably contains dissolved therein a minor amount (e.g., 0.5 to 10 percent by weight of the weight of the new fungicidal agent) of a surfactant (or emulsifying agent), which surfactant is also water-soluble. As illustrative of such a concentrate is a solution of N-(2-tetrahydropyranyl) o-benzoicsulfimide in acetone which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides such as mannitan or sorbitan.

In all of the various dispersions described hereinbefore for fungicidal purposes, the active ingredients can be one or more of the compounds of this invention. The compounds of this invention can also be advantageously employed in combination with other pesticides, including, for example, insecticides, nematocides, bacteriocides, and herbicides. In this manner it is possible to obtain mixtures which are effective against a wide variety of pests and other forms of noxious life.

In controlling or combatting fungal organisms the fungicidal agents of this invention either per se or compositions comprising same are supplied to the fungal organisms or to their environment in a lethal or toxic amount. This can be done by dispersing the new fungicidal agent or fungicidal composition comprising same in, on or over an infested environment or in, on or over an environment the fungal organisms frequent, e.g. agricultural soil or other growth media or other media infested with the fungal organisms or attractable to the organisms for habitational or sustenance or propagational purposes, in any conventional fashion which permits contact between the organisms and the fungicidal agents of this invention. Such dispersing can be brought about by applying the fungicidal agent per se or sprays or particulate solid compositions containing same to a surface infested with the fungal organisms or attractable to the organisms, as for example, the surface of agricultural soil or other media such as the above ground surface of plants by any of the conventional methods, e.g. powder dusters, boom and hand sprayers, and spray dusters. Also for sub-surface application such dispersing can be carried out by simply mixing the new fungicidal agent per se or fungicidal spray or particulate solid compositions comprising same with the infested environment or with the environment the fungal organisms frequent, or by employing a liquid carrier for the new fungicidal agent to accomplish sub-surface penetration and impregnation therein.

The embodiments of the invention, in which an exclusive property or privilege is claimed, are defined as follows:

1. A compound of the formula

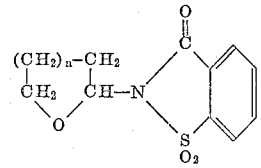

wherein $n$ is a whole number from 1 to 2.

2. N-(2-tetrahydropyranyl) o-benzoicsulfimide
3. N-(2-tetrahydrofuranyl) o-benzoicsulfimide
4. The method of making a compound of claim 1 which comprises reacting in a fluid medium saccharin with a compound of the formula

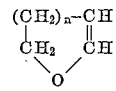

wherein $n$ is a whole number from 1 to 2 in the presence of a catalytic amount of an acid catalyst selected from the group consisting of strong mineral acid, benzene sulfonic acid and p-toluene sulfonic acid.

5. The method of making a compound of claim 1 which comprises reacting at a temperature in the range of from about 30° C. to about 125° C. saccharin with a compound of the formula

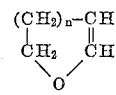

wherein $n$ is a whole number from 1 to 2 in the presence of a catalytic amount of hydrogen chloride.

References Cited in the file of this patent

UNITED STATES PATENTS

| | | |
|---|---|---|
| 2,623,048 | Long et al. | Dec. 23, 1952 |
| 2,855,401 | Barber et al. | Oct. 7, 1958 |
| 2,949,399 | Lo | Aug. 16, 1960 |
| 3,002,884 | Lo | Oct. 3, 1961 |